United States Patent [19]

Bengtsson

[11] Patent Number: 5,182,704
[45] Date of Patent: Jan. 26, 1993

[54] METHOD AND DEVICE FOR REGULATING THE SPRAYING OF COATING MATERIALS

[75] Inventor: Bengt-Göran Bengtsson, Angered, Sweden

[73] Assignee: Advanced Flow Control AFC Aktiebolag, Sweden

[21] Appl. No.: 603,703

[22] PCT Filed: May 18, 1989

[86] PCT No.: PCT/SE89/00271
§ 371 Date: Dec. 24, 1990
§ 102(e) Date: Dec. 24, 1990

[87] PCT Pub. No.: WO89/11340
PCT Pub. Date: Nov. 30, 1989

[30] Foreign Application Priority Data

May 18, 1988 [SE] Sweden .................. 8801847

[51] Int. Cl.⁵ .................. G05B 13/02; B05B 12/14
[52] U.S. Cl. .................. 364/148; 364/510; 118/696; 239/69
[58] Field of Search .............. 364/148, 162, 510, 558; 118/679, 683, 696, 697, 706; 239/69, 71

[56] References Cited

U.S. PATENT DOCUMENTS

| | | | |
|---|---|---|---|
| 4,562,552 | 12/1985 | Miyaoka et al. | 364/148 |
| 4,593,360 | 6/1986 | Cocks | 364/468 |
| 4,614,300 | 9/1986 | Falcoff | 239/71 |
| 4,660,771 | 4/1987 | Chabert et al. | 239/69 |
| 4,928,880 | 5/1990 | Prus et al. | 239/8 |
| 4,992,952 | 2/1991 | Sasaki | 364/510 |

Primary Examiner—Jerry Smith
Assistant Examiner—Paul Gordon
Attorney, Agent, or Firm—Lerner, David, Littenberg, Krumholz & Mentlik

[57] ABSTRACT

In a device for accomplishing a method of regulating the spraying of coating material such as paint, the coating material is fed by a pump (1) to a spray device (2). A flow transducer (4), which generates a true flow signal ($Q_A$), a pressure transducer (6), which generates a true pressure signal ($P_A$), and an actuator (5), which sets the pressure of the coating material in accordance with the control pressure signal ($P_C$), are provided in the supply line between the pump and the spray device. A co-efficient signal (K) is formed by an estimator (8) as a function of the true flow signal ($Q_A$) and a chosen set-point flow signal ($Q_R$). An adaptor (7) determines a set-point pressure signal ($P_R$) as a function of the set-point flow signal and the co-efficient signal. A pressure regulation circuit (9) determines the control pressure signal ($P_C$) as a function of the set-point pressure signal and the true pressure signal. The set-point flow signal is thus converted in accordance with the true flow signal to a set-point pressure signal, which is used to set the actuator.

17 Claims, 4 Drawing Sheets

METHOD AND DEVICE FOR REGULATING THE SPRAYING OF COATING MATERIALS

TECHNICAL FIELD

The present invention relates to a method for regulating the spraying of coating materials and includes the steps:
  feeding coating material by means of a pump to a spray device;
  setting a set-point flow value for forming a set-point flow signal corresponding to a desired flow rate, with which it is desired to spray the coating material using the spray device;
  measurement of the true flow rate of the coating material to form a true flow signal.

The present invention also relates to a device for regulating the spraying of coating materials comprising:
  a pump for feeding the coating material to a spray device; and
  a flow transducer for measuring the true flow rate of the coating material for forming a true flow signal.

BACKGROUND ART

Spray pistols and nozzles for spraying different kinds of coating materials are well known. The most common sprayed coating material is paint, but even other materials such as vinyls are used.

When spraying paint and other coating materials it is of great importance that the work piece to be sprayed receives as even a coating as possible. This is for example the case when spray-painting car chassis, whereby spray-painting is carried out automatically or semiautomatically along an assembly line and is often performed by a robotic system. Since spray systems for different types of coating materials are principally the same, for the sake of simplicity, and without lessening its generality, the description below will refer to the spraying of paint.

Known paint spraying systems normally include a device for supplying paint which includes some form of pump, compressor, or pressure vessel for feeding paint under pressure; a paint pressure regulator or other actuator; and a spray nozzle, which is connected to the pressure regulator by means of a hose. Several factors contribute to the difficulties these known systems suffer from when it comes to ensuring that the paint coating of the work piece will be even.

An important factor which makes regulation of the flow of paint through the paint nozzle more difficult is the viscosity of the paint. Even in the presence of a constant supply pressure, a change in the viscosity leads to a change in the flow: The flow decreases when the viscosity increases, and increases when the viscosity decreases. Changes in viscosity may arise in different ways, e.g., as a result of the aging of the paint, the mechanical working of the paint and solvents in a circulation system, or the deliberate addition of solvents. The viscosity also decreases with increasing temperature and increases with decreasing temperature.

Another obvious factor which may influence the paint flow through the nozzle is a deliberate or inadvertant change in the supply pressure. Of course, no pump or compressor can achieve completely constant supply pressure, but even such an ideal pump would not be sufficient to maintain constant pressure to the other system components since elastic hoses are as a rule used for transporting the paint. The elasticity of the hoses causes the hoses to act as accumulators, with drops and build-ups of pressure when the pistol is activated and shut off.

The most obvious factor is that the spray system often needs to be able to change the paint flow in order to maintain evenness without unnecessary paint losses. An example of this is when the spray system must alternate between spraying a wide portion and a narrow portion of the work piece. If the flow of paint through the nozzle were to remain constant, the layer of paint on the narrow portion would be thicker if only the width of the paint jet were changed without changing the flow. If the width is not changed, the thickness might be correct on the narrow portion, but paint would be wasted and adjacent portions might be sprayed inadvertently. If the time between spray-painting the wide and the narrow portions must be short, the further problem arises that the time for readjustment of the paint spray system must also be very short, since any delay leads to unevenness.

Different types of controllable paint pressure regulators are known, but the most common type comprises a housing which is divided into three chambers. Paint under pressure is fed into an intake chamber. A central chamber has an outlet which leads to a spray nozzle via a hose. Paint entering the intake chamber can pass through a closable opening in a dividing wall between the intake chamber and the outlet chamber. The third chamber consists of a compressed-air chamber which is separated from the outlet chamber by means of an elastic membrane. A pin or cone is securely joined with the membrane, extends through the outlet chamber, and partially plugs the closable opening. The pin usually has a conical end portion, which lies in the closable opening. By changing the air pressure in the compressed-air chamber, which determines the deflection of the membrane, the position of the end portion of the pin in the closable opening is changed and leads in turn to a change in the size of the area of the closable opening through which paint can flow.

Two main methods are used to generate a control signal to the paint pressure regulator. According to the one method, one feeds back a signal corresponding to the rate of paint flow. This is a natural solution considering the fact that it is the flow which is to be regulated. The flow is most often measured between the feed pump and the paint pressure regulator. Because of the accumulating effect of the hoses it would be preferable to measure the flow at the paint nozzle, but flow meters are generally too unwieldy for this. An additional disadvantage of feeding back the flow is that paint can spray from the nozzle even when the flow at the point of measurement is zero. This is because of the elasticity of the membrane in the paint pressure regulator, and because of the accumulating effect of an elastic hose; an overpressure may be present in the feed hose to the nozzle even when it is completely closed off, and if the regulation system does not compensate for this overpressure, the paint will be sprayed very unevenly immediately after the nozzle is once again opened.

According to the other known method one feeds back a signal corresponding to the paint pressure somewhere in the system. An advantage of this method is that pressure transducers are generally faster and less complicated that flow transducers; slow measurement causes slow regulation, which is very disadvantageous, particularly in paint spray systems which must rapidly change the rate of flow. The advantages of pressure measurement were mentioned above. Pressure measurement is, however, not wholly satisfactory. First, the relationship between pressure and flow varies as a function of the viscosity of the paint. Second, because of unavoidable inertial sluggishness in the supply device, and also because of viscous forces, a certain overpressure is required before any flow can arise at all.

The principle object of almost all control systems for paint spraying is to maintain the true rate of paint flow through the nozzle—the true flow—equal to a predetermined set-point value. U.S Pat. Nos. 4,019,653; 4,324,366; 4,487,367; 4,614,300; and the German Patents DE 34 23 094 A1; and DE 28 19 302 B2 disclose control systems for spraying paint In these systems either the flow or the pressure is fed back, but not both of these values, and none of them includes any device which compensates for changes in the viscosity of the paint.

U.S. Pat. No. 4,562,088, however, discloses a control system which measures not only pressure but also flow, and which takes viscosity into account. In this system the pressure is, however, measured at a point before the paint pressure regulator and only for the purpose of calculating the relationship between the temperature and the flow of the paint, and several temperature transducers are arranged in order to determine the necessary control parameters. Futhermore, the system relies on a method and a device in which paint must be drawn from the main flow and heated. Although the system represents in principle an improvement over the above-mentioned patents, it still cannot compensate for changes in supply pressure and other temperature-independent factors. Considering that it also requires a parallel paint conduit, in which choke regions, temperature transducers, and a heater are required, and also requires a microprocessor with its necessary peripheral equipment for calculating the exponential function which is used, this represents a very complicated system for ascertaining viscous effects.

TECHNICAL PROBLEM

The purpose of the present invention is accordingly to provide regulation of a spray system for coating materials which eliminates the above-mentioned disadvantages, which is faster and more accurate than known control systems, and which utilizes not only the true flow, but also the true pressure, and which also takes into account the viscosity of the coating material when determining control parameters.

SUMMARY OF THE INVENTION

The stated object is achieved by means of the method according to the present invention, which is characterized by including the steps:
  generating an estimated coefficient signal in an estimator in accordance with the set-point flow signal and the true flow signal;
  generating a set-point pressure signal in accordance with the set-point flow signal and the estimated coefficient signal;
  measuring the pressure of the coating material for generating a true pressure signal;
  generating a control pressure signal in accordance with the set-point pressure signal by means of a pressure regulating device; and
  changing the pressure of the coating material by means of an actuator in accordance with the control pressure signal.

The stated object is also achieved by means of the device according to the present invention, which is characterized by comprising:
  a pressure transducer whose output signal is a true pressure signal;
  an estimator having a first estimator input signal, a second estimator input signal, and an estimator output signal;
  a converter having a first converter input signal, a second converter input signal, and a converter output signal, which constitutes a set-point pressure signal;
  a pressure regulation circuit having a first pressure regulation input signal, a second pressure regulation input signal, and a pressure regulation output signal, which constitutes a control pressure signal;
  an actuator having an input signal consisting of an adjustment signal for adjustment of the pressure of the coating material;

whereby:
  the pressure transducer is connected to the estimator, whereby the first estimator input signal is the true flow signal;
  the second estimator input signal is the set-point flow signal;
  the estimator is connected to the converter, whereby the first converter input signal is the estimator output signal;
  the second converter input signal is the set-point flow signal;
  the converter is connected to the pressure regulation circuit, whereby the first pressure regulation input signal is the set-point pressure signal;
  the pressure transducer is connected to the pressure regulation circuit, whereby the true pressure signal constitutes the second pressure regulation input signal; and
  the pressure regulation circuit is connected to the actuator, whereby the control pressure signal constitutes the adjustment signal of the actuator.

DESCRIPTION OF THE DRAWINGS

An exemplifying embodiment of the invention will now be described with reference to the accompanying drawings, in which.

BEST MODES OF CARRYING OUT THE INVENTION

Even below it will be assumed that one wishes to spray paint. As was mentioned in the introduction, however, this is done only for the sake of simplicity. The method and device described below are thus applicable for spraying other types of materials. Even so-called atomization air jets and fan air, which are used to atomize the paint jet, may be regulated by means of the present invention.

Figure 1:
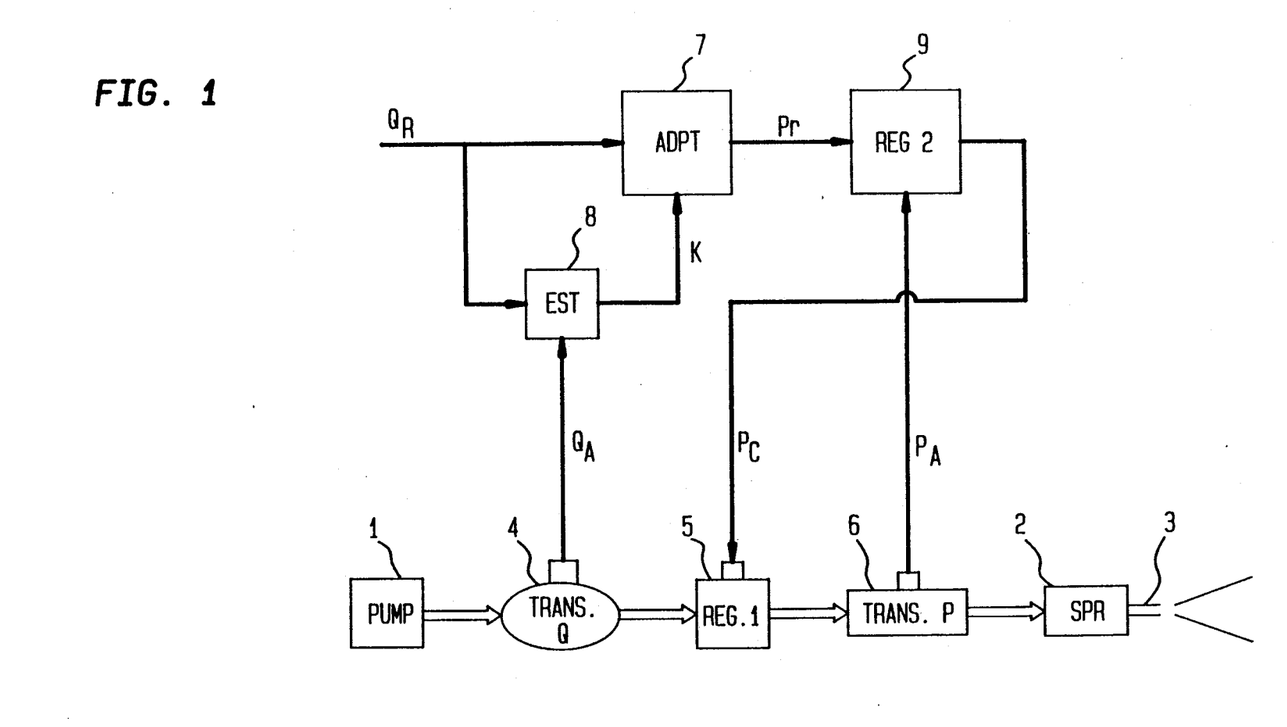
FIG. 1 shows a greatly simplified schematic block diagram of the spray regulating device according to the invention.

Referring to FIG. 1, the spray device according to the invention comprises a paint feed pump 1, which may be of an arbitrary type, for supplying paint under pressure to the rest of the system. The path of flow of the paint is illustrated in the figures using double parallel lines, whereas electric and pneumatic signals are illustrated using single lines.

As is conventional, paint is fed from the pump 1 to a spray device 2, which comprises a nozzle 3 or some other opening through which paint is sprayed onto a work piece (not shown). The spray device preferable also comprises a valve arrangement (not shown) for activating and shutting off the paint flow through the nozzle 3. If the spray device 2 consists of a spray pistol, this valve arrangement may for example be of the type Devilbiss T-AGB-979-797-FF The Devilbiss pistol is of the atomizing type and has separate flows of atomizing air and fan air.

A paint flow transducer 4, an actuator 5, e.g., a paint pressure regulator of the type Devilbiss HGS-5112, and a pressure transducer 6, preferably in that order, are arranged in the paint supply path from the pump 1 to the spray device 2. The paint flow transducer 4 may be of a known type such as the Küppers ZHM,02, possibly together with a separate electrical converter, which generates an electric flow signal $Q_A$ having a voltage or current strength which is proportional to the rate of paint flow through it.

The actuator 5 may also be of a known type, whereby the pressure of the paint in the supply path is a function of a control pressure signal $P_C$, which is transmitted to the actuator 5. A suitable choice for the actuator 5 would be the regulator mentioned above having a membrane. In such case the pneumatic pressure which is supplied to the compressed-air chamber corresponds to the control pressure signal $P_C$. It is, however, obvious that other types of regulators could also be used, whereby the control pressure signal is chosen to correspond to the chosen regulator. For example, if the actuator provides control and pressure changes by means of electro-mechanical adjustment of a check valve, e.g., of the type Danfoss EVSEM, the control pressure signal $P_C$ would suitably be electrical, without any intermediate conversion to air pressure.

The pressure transducer 6 may also be of a known type. It generates an electrical true pressure signal $P_A$. If the actuator is of the pressure-regulating type having sufficient accuracy of pressure regulation, the external pressure feed-back with the pressure transducer 6 and the pressure regulating circuit 9 will be included in the regulator 5. This is for example the case when regulating atomizing air and fan air to the above-mentioned Devilbiss pistol. If the actuator is of the gear-driven type with electric motor drive, the control pressure signal $P_C$ is preferably electrical and is connected to the speed (RPM) input of the motor drive.

An electric flow signal $Q_R$ corresponding to a set-point value of paint flow is generated and set in a conventional manner using, for example, a potentiometer which divides a predetermined reference voltage. It could, however, also be generated using a digital system by conversion of a digital set-point flow value to its analog equivalent. The set-point flow signal $Q_R$ is received as an input signal by a adaptor 7 and by an estimator 8. The true flow signal $Q_A$ is also an input signal to the estimator 8. The estimator 8 generates a number of coefficient signals K, which also constitute input signals to the adaptor 7. FIG. 1 shows only one lead for K, but in certain advanced embodiments this signal may in turn comprise several signals, as will be explained below.

The adaptor 7 generates an electric set-point pressure signal $P_R$, which is conveyed as an input signal to a pressure regulation circuit 9. The pressure regulation circuit 9 in turn generates the control pressure signal $P_C$.

It is not necessary for the estimator 8 to be provided immediately adjacent to the paint flow transducer 4, from which it receives the true flow signal $Q_A$, or for the pressure regulation circuit 9 to be provided immediately adjacent to the pressure transducer 6, from which it receives the pressure signal $P_A$. It is advantageous and customary to transmit such signals in such a way that it is their electrical current strength, and not their voltage level, which defines the measured value, but it is advantageous when using electrical circuits such as the estimator 8 and the pressure regulation circuit 9 to process the signals as varying voltages. Current-to-voltage converters (not shown) are therefore preferably provided at the inputs of the estimator 8 and the pressure regulation circuit 9. The output signal from the pressure regulation circuit 9, i.e., the control pressure signal $P_C$, is generated for similar reasons as a voltage signal, but it may be desired to transmit this signal to the actuator 5 as a current signal. In this case, a voltage-to-current converter (not shown) is similarly provided between the pressure regulation circuit 9 and the actuator 5.

In those cases in which the actuator 5 is of the type mentioned above having a membrane, it is also necessary to convert electrical current to pressure, and in such cases a suitable converter is provided. Converting voltage signals to current signals and vice versa, and converting current signals to varying air pressure, are well-known techniques and will therefore not be described in greater detail here.

Figure 2:
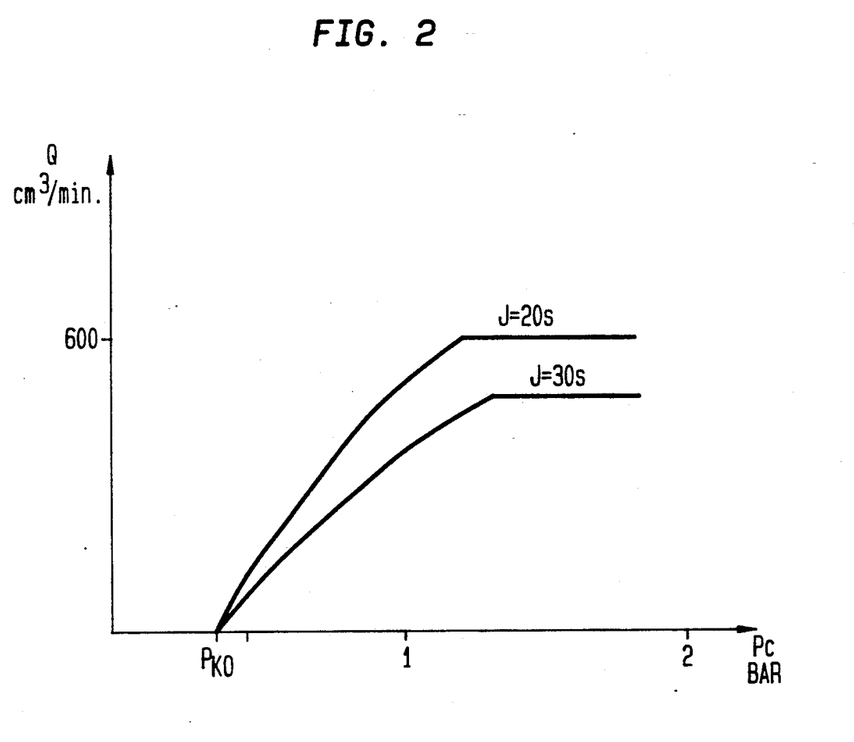
FIG. 2 illustrates the relationship between control pressure and flow for a representative coating material.

FIG. 2 illustrates the relationship between the rate of paint flow through the system, the control pressure $P_C$, and the paint viscosity v, for a test measurement of a representative, commercially common paint type, and, similarly, a commercially available actuator and nozzle. The viscosity values shown were measured using measurement cups of the type Ford 4. Whereas the values for pressure and flow will naturally depend on the type of equipment used, so that the quantitative relationship will vary, the qualitative relationship will remain approximately the same for different systems and types of paint. It should first of all be observed that there is no flow at all until the pressure exceeds a certain constant off-set pressure $P_{KO}$. This off-set pressure is a result of the construction of the actuator and is proportional to the supply pressure of the paint. Secondly, one sees that both of the illustrated curves have a maximum flow, which results from the fact that the feed pump has a maximum possible supply pressure Under normal operating conditions, the control pressure $P_C$ will never need to be so great that the maximum rate of flow is reached Below this maximum value, the curves may be approximated to a high degree of accuracy using a third-order polynomial, which expresses the flow as a function of the control pressure.

The relationship between the flow and the true pressure of the paint in the system is qualitatively the same as that which is illustrated by the curves in FIG. 2. The relationship between the pressure and flow rate of the paint in the supply system can therefore also be approximated with to a high degree of accuracy using a third-order polynomial. In almost all cases in which paint spray systems of the present type are used, a second-order polynomial is sufficient. This assumption is also supported theoretically.

A term $K_o$, which is independent of the flow rate and corresponds to a minimum pressure, is required if there is a static height differential between the spray nozzle and the pressure transducer. It is furthermore known that the viscous force on a long, slender hose is approximately linear in the flow, and that the viscous force which arises from a flow through an opening such as the nozzle opening 3 is approximately proportional to the square of the flow rate. In paint systems such as the present system, higher order terms are clearly of minor importance. The fact that the pressure can be approximated using a third or second-order polynomial means that the set-point pressure can also be approximated with such a polynomial, in which the set-point flow constitutes the argument. The set-point pressure can in other words be approximated using the following polynomial:

$$P_R = K_o + K_1 Q_R + K_2 Q_R^2 + K_3 Q_R^3 \tag{E1}$$

As was mentioned above, third-order terms may normally be dropped, which means that $K_3$ is set equal to zero. In such case the expression E1 may be simplified to:

$$P_R = K_o + K_1 Q_R + K_2 Q_R^2 \tag{E2}$$

Of particular note is the fact that the viscosity of the paint is implicit in this expression, as will be understood from FIG. 2 and the explanation of FIG. 2. A change in the viscosity of the paint means that the curve which describes the relationship between pressure and flow first and foremost receives a different general "slope", i.e., $K_1$ is changed, and a slightly changed curvature, i.e., $K_2$ is changed. As FIG. 2 shows, and as has been established through empirical tests, the coefficient $K_2$ of the quadratic term may, however, for all practical purposes be assumed to be constant during spraying of a given paint type, but will naturally vary depending on the mechanical construction of the spray system.

Figure 3:
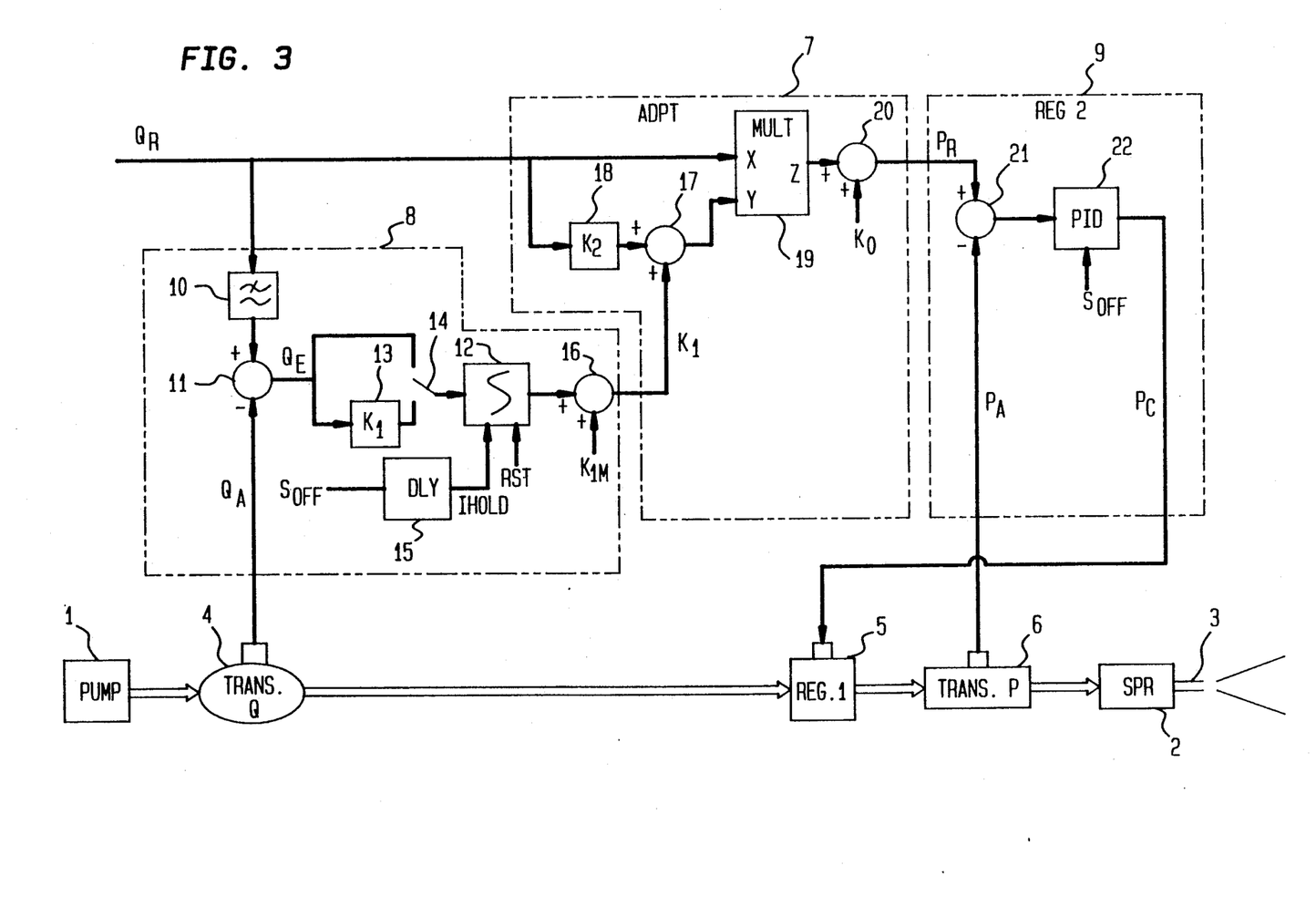
FIG. 3 is a block diagram of the spray regulating device in FIG. 1 in greater detail.

FIG. 3 shows a block diagram of an exemplifying embodiment of the invention which implements and utilizes the expression E2. One will note that FIG. 3 is a more detailed block diagram of the system illustrated in FIG. 1. In FIG. 3, the adaptor 7, the estimator 8, and the pressure regulation circuit 9 are represented using dashed lines. These will now be described individually.

As FIG. 3 shows, the set-point flow signal $Q_R$ passes through a low-pass filter 10, which preferably has unity amplification at low frequencies. The output signal from the low-pass filter 10 is connected to an adding input of a summing element 11 and the true flow signal $Q_A$ is connected to its subtracting input The output signal from the summing element 11 is therefore a flow error signal $Q_e$, where $$Q_e = Q_R - Q_A$$

when the set-point flow in the spraying system changes rapidly, the paint flow transducer 4, as well as any included flow-current-voltage converter, generally requires a certain time before the true flow signal $Q_A$ has stabilized to the correct value The time constant of the low-pass filter 10 is thus chosen so that the low-pass filter delays the set-point flow signal $Q_R$ to the summing element 11 by a time equal to the stabilization time for the true flow signal $Q_A$. This is done to prevent misleading flow error signals $Q_e$ from influencing the control system when the flow changes.

The flow error signal $Q_e$ is connected to the signal input of an integrator 12 via one of two parallel signal paths, whereby the one path constitutes a unity path and is a simple conductor. In the other path, however, an amplifying, i.e., multiplying element 13, having an amplification factor $K_I$ is provided. The choice between the paths is preferably made manually by means of a switch 14. As is shown in FIG. 3, the switch 14 determines the integration constant for the integrator 12. $K_I$ is preferably set to a value which is greater than one, e.g. ten. An increase in $K_I$ provides increased speed in the setting of $K_1$ and $K_2$ and is used at system start-up and when changing paints. Low amplification is used during normal paint spraying in order to provide good distortion suppression. The viscosity of the paint changes very slowly.

The integrator 12 is provided with two other inputs. The one input receives a zeroing signal RST, which may be generated during system start-up and when changing paints. The other input receives an interrupt-/hold signal $I_{hold}$ from a delay circuit 15, which generates the interrupt/hold signal $I_{hold}$ when it senses the presence of a shut-off signal $S_{off}$. $S_{off}$ is generated when the spray nozzle is closed. For the reasons described above, such as the adjustment time of the paint flow transducer 4, the flow error signal $Q_e$ does not provide valid information about the system during a short period immediately after initial activation, i.e. opening, of the nozzle. The time constant of the delay circuit is therefore chosen with respect to the dynamic and electric characteristics of the chosen paint flow transducer 4. When the flow ceases it is, however, important that the integrator 12 not continue to integrate, since the set-point flow value $Q_R$ will in most cases still not be equal to zero. Uninterrupted integration would cause large and erroneous output signals from the integrator 12. Even during the adjustment time immediately after system activation, the delay circuit 15 generates the interrupt signal $I_{hold}$, which causes the integrator to hold its output value constant, i.e., it stops integrating. Integration continues only when the interrupt signal $I_{hold}$ is not present.

The output signal from the integrator 12 is connected to one adding input of a summing element 16. A first mid-point signal $K_{1m}$ is connected to the second adding input of the summing element 16. The output signal from the summing element 16, i.e., the signal which comprises the sum of the output signal from the integrator 12 and $K_{1m}$, comprises a first coefficient signal $K_1$, which corresponds to the coefficient of the linear term in the expression E2. As its name indicates, the first mid-point signal $K_{1m}$ indicates the approximate average or zero-value of $K_1$. $K_{1m}$ corresponds to the normal value $K_1$ has for the chosen paints. $K_{1m}$ is preferably adjusted manually and may thereafter be left constant for the chosen paints. The first mid-point signal $K_{1m}$ is included because of the limitation in output amplitude of the integrator 12. If the range of its amplitude is large enough to cover all possible values of the first coefficient signal $K_1$, the mid-point signal $K_{1m}$ and the summing element 16 may be left out, but the range requirement of the integrator is significantly reduced by these elements, since the integrator 12 need only generate positive and negative variations about the mid-point signal $K_{lm}$. This provides for quicker adjustment of $K_1$ after any system failure which might arise.

The adaptor 7 in the present exemplifying embodiment will now be described, still with reference to FIG. 3. The adaptor 7 includes a summing element 17. The first coefficient signal $K_1$, received from the estimator 8, is connected to one adding input of the summing element 17. The set-point flow signal $Q_R$ is connected via an amplifying, i.e., multiplying, element 18 to the other adding input of the summing element 17. The output signal from the summing element 17 is therefore equal to $K_1 + K_2 Q_R$. The adaptor 7 further comprises a multiplier 19, whereby the value of its output signal Z is the product of the value of its two input signals X and Y, which have corresponding inputs. The output signal from the summing element 17 is connected to one of these inputs (shown as the Y-input in FIG. 3), whereby the set-point flow signal $Q_R$ is connected to the second input (the X-input in FIG. 3). The output signal from the multiplier 19 is therefore equal to $K_1 Q_R + K_2 Q_R^2$. The output signal from the multiplier 19 is connected to one adding input of a summing element 20. To its other adding input is connected a constant coefficient signal $K_0$, which is set manually. The output signal from the summing element 20 therefore equal to $K_0 + K_1 Q_R + K_2 Q_R^2$, which one will recognize from the expression E2 as the set-point pressure signal $P_R$.

From FIG. 3 and the explanation above one will observe that the combination of the adaptor 7 and estimator 8 generates a set-point pressure signal from the set-point and true flow signal.

The pressure regulation circuit 9 will now be described with reference to FIG. 3. It includes a summing element 21 and a regulator circuit 22. The summing element 21 has an adding input, to which is connected the output signal from the summing element 20, i.e., the set-point pressure signal $P_R$, as well as a subtracting input, to which the true pressure signal $P_A$ from the pressure transducer 6 is connected.

The regulator circuit 22 is preferably of a known type, such as a PID-regulator, with mainly PI-operation when the actuator consists of a paint pressure regulator (in almost all practical cases no D-operation is required), and the output signal from the summing element 21 is connected to its signal input. The output signal from the PID-regulator 22 is the control pressure signal $P_C$. In order to prevent continued integration of $P_R$ and $P_A$ when the flow is zero, when the spray nozzle is closed, the integration interrupt signal $I_{hold}$ is also transmitted in a known fashion to the PID-regulator 22.

It is important to note that the PID-regulator 22 continues to operate even when the interrupt signal $I_{hold}$ is applied to it and when the flow through the nozzle 3 is closed off. During this time the contribution of the integrating part of the PID-regulator 22 will be held constant at the latest value. The set-point pressure signal will also constitute a constant input signal to the PID-regulator. The P-portion of the PID-regulator will also continue to operate, so that it will be influenced by the true pressure signal $P_A$ and will in turn adjust the control pressure signal $P_C$. In this way compensation is also provided for the overpressure (increased $P_A$) which may possibly arise because of the accumulating effect of the hoses when the spray nozzle is closed off so that, when the nozzle is opened, initial irregularities in the flow are minimized.

According to the invention one therefore utilizes pressure feed-back for adjustment of the actuator 5. The pressure signals to the pressure regulation circuit 9 therefore consist of the true paint pressure, as measured by the pressure transducer 6, and by a set-point pressure signal, which is provided by the estimator 8 and the adaptor 7. The true flow $Q_A$ is thus used only to generate the set-point pressure signal The method of operation is best illustrated by means of a simple example.

Assume that the rate of paint flow is greater than zero, but drops so that it becomes less than the true flow signal, i.e. $0 < Q_A < Q_R$. This causes the flow error signal $Q_e$ to become positive. Since $Q_e$ is integrated by the integrator 12, the first coefficient signal $K_1$ will increase, which leads to an increase in the set-point pressure signal $P_R$. The pressure regulation circuit 9 will then influence the actuator 5 so that the paint pressure is increased. This leads to an increase in flow, and this continues until $K_1$ is stabilized, i.e., until $Q_A$ is equal to $Q_R$.

The various summing elements may be implemented simply in a conventional manner using resistor nets and operational amplifiers; it is, however, obvious that certain operations which follow one upon the other, such as amplification and summing, could be combined in a single operational amplifier. Operational amplifiers may also be used to implement several other elements in the present embodiment, e.g., the integrator 12 and current-to-voltage converters (not shown) from the flow transducer 4 and the pressure transducer 6. Even in this case, certain combinations are natural The PID-regulator 22 may also be implemented in a known manner using an operational amplifier, but it may also consist of some other commercially available PID-regulator The low-pass filter 10 and the delay circuit 15 may for example consist of simple RC-networks, preferably with variable time constants in order to facilitate the above-mentioned adjustment of their respective lag times. The electrical signals for the various constant parameters such as $K_{lm}$, $K_0$ an $P_0$ may, as $Q_R$, be generated using potentiometers which divide suitably chosen reference voltages The shut-off signal $S_{off}$ and the zeroing signal RST may be implemented using simple relays. One should note that an integrator may be caused to halt integration and to hold its output signal constant by means of disconnecting its input signals; it is therefore of course the case that integration continues, but a constant input signal equal to zero does not cause any change of the output signal.

Since the present regulator system consists almost entirely of very well-known, mass-produced electronic components, it is easily manufactured. Furthermore, since several operational amplifiers are normally packaged as a single integrated circuit, the regulator system may be made compact. Only the multiplier 19 requires a special component. A suitable choice for the multiplier 19 is the commercially available analog multiplier having the standard part number AD 534.

In order to make it easier to supervise the control system and the adjustment of the manually adjusted parameters, a first display device, which shows the chosen set-point flow $Q_R$, and a second display device which shows the true flow value $Q_A$, are preferably provided. The first coefficient signal $K_1$ may be shown by an additional display device, which is suitably graduated in values of viscosity.

A second embodiment of the present invention will now be described with reference to FIGS. 3 and 4. As will become apparent, this second embodiment is an extension of the above described first embodiment. The extension consists in the fact that the second coefficient signal $K_2$ is automatically generated and is allowed to vary.

Figure 4:
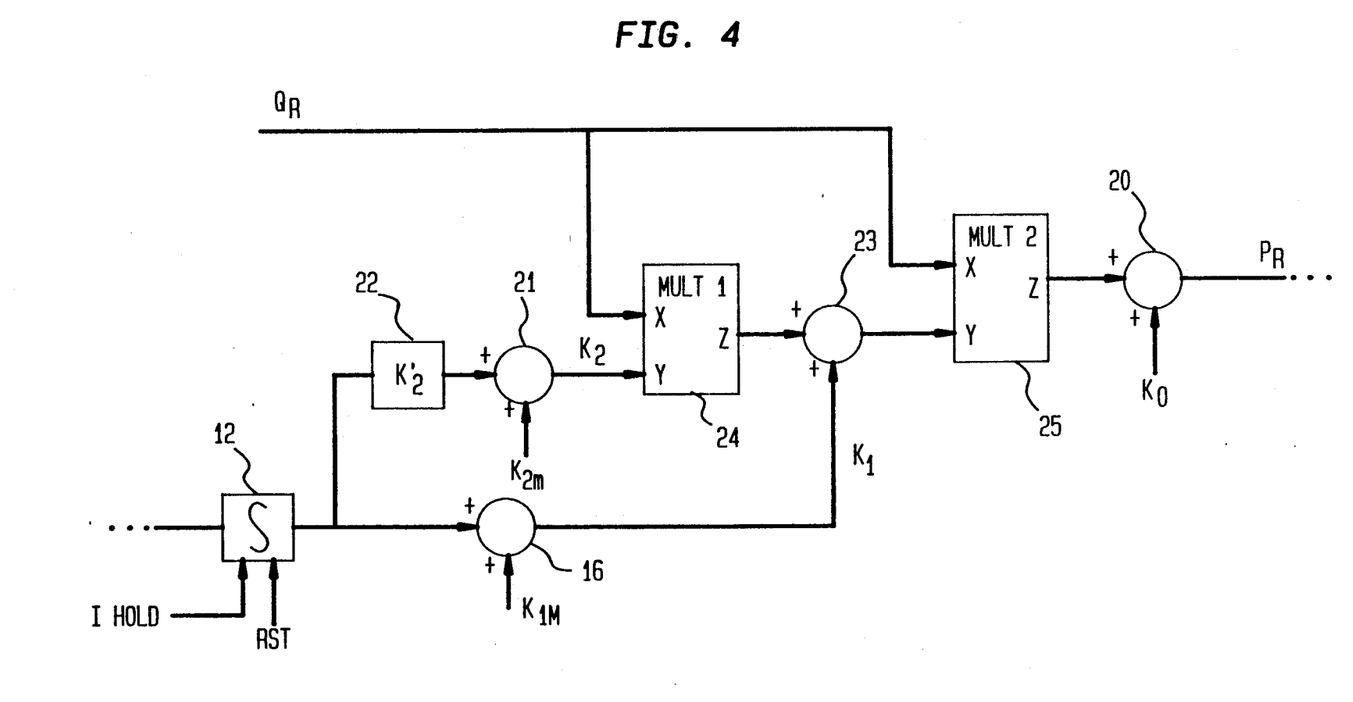
FIG. 4 is a block diagram illustrating an alternative embodiment of the regulation device according to the invention.

The dots before the inputs to the integrator 12 and after the output from the summing element 20 in FIG. 4 indicate that parts of the system which are not shown, but to which they are connected, are the same as those shown in FIG. 3 and require no further description. The integrator 12, the summing element 20, and also the summing element 16, are the same as those shown in FIG. 3, but have been included in FIG. 4 for the sake of clarity.

As is the case in the first embodiment, the output signal from the integrator 12 is connected to the first adding input of the summing element 16, and the first mid-point signal $K_{1m}$ is connected to the second input. The output signal from the integrator 12 is, however, in the second embodiment, also connected to the first adding input of a summing element 21 via a re-scaling element 22, which multiplies, preferably by means of common amplification or voltage division, the output signal by a factor $K_2'$. A second mid-point signal $K_{2m}$ is connected to the second adding input of the summing element 21. The second mid-point signal $K_{2m}$ is suitably set in the same manner as the first mid-point signal, and is chosen to correspond to the normal value $K_2$ has for the chosen paints.

The output signal from the summing element 21 thus constitutes the second coefficient signal $K_2$, which is connected to the first multiplying input of a first multiplier 24. The set-point flow signal $Q_R$ is connected to the second multiplying input of the first multiplier 24.

The output signal from the first multiplier 24 is connected to the first adding input of a summing element 23 The first coefficient signal $K_1$, which is the output signal from the summing element 16, is connected to its second adding input.

The output signal from the summing element 23 is connected to one multiplying input of a second multiplier 25. The set-point flow signal $Q_R$ is connected to the other multiplying input of the second multiplier 25.

The operation of the first and second multipliers 24 and 25, respectively, is the same as was described above for the multiplier 19 in the first embodiment, which is shown in FIG. 3.

The output signal from the second multiplier 25 is connected to one of the adding inputs of the summing element 20, and, as was the case in the first embodiment, the constant coefficient signal $K_0$ is connected to the other of the adding inputs The output signal from the summing element 20, i.e., the set-point pressure signal, is also the same as in the first embodiment, i.e.:

$$P_R = K_0 + K_1 Q_R + K_2 Q_R^2$$

One will recognize this expression as the expression E2 above The difference is, however, that $K_2$ has been estimated in the second embodiment, whereas it was assumed to be constant in the first According to yet another embodiment of the invention, the estimator 8, the adaptor 7, and the pressure regulation circuit 9 are implemented digitally, whereby filtering, summing, integration, multiplication, amplification, etc., are carried out by a micro-processor using suitable, known digital algorithms. The connection to mechanical components such as to the actuator 1, the pressure transducer 6, etc., is arranged via known analog-to-digital and digital-to-analog converters. The principle, however, remains the same: feeding back the paint flow in order to estimate co-efficients in a polynomial, which is used to calculate set-point pressure as a function of a chosen set-point flow, as well as feeding back true pressure for pressure regulation.

I claim:

1. Method for regulating the spraying of coating material including the steps:

feeding coating material by means of a pump (1) to a spray device (2);

setting a set-point flow value to form a set-point flow signal ($Q_R$) corresponding to a desired rate of flow at which one wishes the coating material to be sprayed by the spray device;

measurement of the true rate of flow of the coating material to form a true flow signal ($Q_A$);

characterized by including the steps:

generating an estimated co-efficient signal (K) in an estimator (8) in accordance with the set-point flow signal ($Q_R$) and the true flow signal ($Q_A$);

generating a set-point pressure signal ($P_R$) in accordance with the set-point flow signal ($Q_R$) and the estimated co-efficient signal (K);

measuring the pressure of the coating material for forming a true pressure signal ($P_A$);

generation of a control pressure signal ($P_C$) in accordance with the point pressure signal ($P_R$) by means of a pressure regulation device (9); and varying by means of an actuator (5) the pressure of the coating material in accordance with the control pressure signal ($P_C$).

2. Method as defined in claim 1, characterized in that the generation of the co-efficient signal (K) includes generation of a flow error signal ($Q_e$) as the difference between the set-point flow signal ($Q_R$) and the true flow signal ($Q_A$), as well as integration by means of an integrator (12) of the flow error signal for forming an integrator output signal.

3. Method as defined in claim 2, characterized in that the set-point pressure signal ($P_R$) is generated by evaluating a polynomial function of the set-point flow signal ($Q_R$).

4. Method as defined in claim 3, characterized in that the polynomial function is a second-order polynomial having a constant co-efficient, to which a constant co-efficient signal ($K_0$) corresponds, a first-order co-efficient, to which a first co-efficient signal ($K_1$) corresponds, and a second-order co-efficient, to which a second co-efficient signal ($K_2$) corresponds.

5. Method as defined in claim 4, characterized in that the second co-efficient signal ($K_2$) is constant and in that the estimated co-efficient signal (K) is the first co-efficient signal ($K_1$).

6. Method as defined in claim 5, characterized by the steps:

determining a midpoint value for the first-order co-efficient for forming a first midpoint signal ($K_{1m}$); and generation of the first co-efficient signal ($K_1$) as the sum of the integrator output signal and the first midpoint signal.

7. Method as defined in claim 4, characterized in that the estimated co-efficient signal (K) includes the first co-efficient signal ($K_1$) and the second co-efficient signal ($K_2$).

8. Method as defined in claim 7, characterized by the steps:

determining a midpoint value for the first-order co-efficient for forming a first midpoint signal ($K_{1m}$);

determining a midpoint value for the second-order co-efficient for forming a second midpoint signal ($K_{2m}$);

generating the first co-efficient signal ($K_1$) as the sum of the integrator output signal and the first midpoint signal; and generating the second co-efficient signal ($K_2$) as the sum of the integrator output signal, multiplied by a scale factor ($K'_2$), and the second midpoint signal.

9. Method as defined in claim 1, characterized by generation of an input regulation signal as the difference between the set-point pressure ($P_R$) and the true pressure signal ($P_A$), the input regulation signal constituting the input signal to a PID-regulator, whose output signal constitutes the control pressure signal ($P_C$).

10. Device for regulating the spraying of coating material comprising:

a pump (1) for supplying coating material to a spray device (2);

a flow transducer (4) for measuring the true rate of flow of the coating material for forming a true flow signal ($Q_A$);

means for generating a set-point flow signals ($Q_R$); characterized by comprising:

a pressure transducer (6) whose output signal is a true pressure signal ($P_A$);

an estimator (8) with a first estimator input signal, a second estimator input signal, and an estimator output signal;

an adaptor (7) with a first adaptor input signal, a second adaptor input signal, and an adaptor output signal which constitutes a set-point pressure signal ($P_R$);

a pressure regulation circuit (9) with a first pressure regulation input signal, a second pressure regulation input signal, and a pressure regulation output signal which constitutes a control pressure signal ($P_C$);

an actuator (5), whose input signal consists of an adjustment signal for adjusting the pressure of the coating material;

whereby:

the flow transducer is connected to the estimator, whereby the first estimator input signal is the true flow signal ($Q_A$);

the second estimator input signal is the set-point flow signal ($Q_R$);

the estimator is connected to the adaptor, whereby the first adaptor input signal is the estimator output signal;

the second adaptor input signal is the set-point flow signal;

the adaptor is connected to the pressure regulation circuit, whereby the first pressure regulation input signal is the set-point pressure signal ($P_R$);

the pressure transducer is connected to the pressure regulation circuit, whereby the true pressure signal ($P_A$) constitutes the second pressure regulation input signal; and the pressure regulation circuit is connected to the actuator, whereby the control pressure signal ($P_C$) constitutes an adjustment signal of the actuator.

11. Device as defined in claim 10, characterized in that the estimator (8) includes:

a first summing element (11) with an adding input and a subtracting input, whereby the true flow signal ($Q_A$) generated by the flow transducer (4) is connected to the subtracting input; the set-point flow signal ($Q_R$) is connected to the adding input; and the output signal from the first summing element forms a flow error signal ($Q_e$); and an integrator (12) for integrating the flow error signal.

12. Device as defined in claim 11, characterized in that the set-point flow signal ($Q_R$) is connected to the adding input of the first summing element (11) via a low-pass filter (10).

13. Device as defined in claim 11, characterized in that the estimator includes a second summing element (16) for addition of the flow error signal, which is integrated by the integrator (12) and a first midpoint signal ($K_{1m}$), whereby the output signal from the second summing element constitutes the estimator output signal.

14. Device as defined in claim 10, characterized in that the adaptor (7) includes:

a multiplying element (18) for multiplication of the set-point flow signal by a second co-efficient ($K_2$);

a third summing element (17) for addition of the estimator output signal with the set-point flow signal multiplied by the multiplying element (18), for forming an estimated multiplicand signal;

a main multiplier (19) for multiplication of the set-point flow signal by the estimated multiplicand signal for forming a main multiplication output signal;

a fourth summing element (20) for addition of the main multiplication output signal and a constant co-efficient signal ($K_0$) for forming the set-point pressure signal ($P_R$).

15. Device as defined in claim 10, characterized in that the adaptor (7) includes:

a fifth summing element (21) for addition of the flow error signal, integrated by an integrator (12) and multiplied by a second multiplying element (22), and a second midpoint signal ($K_{2m}$), for forming a first multiplicand signal;

a first multiplier (24) for multiplication of the set-point flow signal by the first multiplicand signal for forming a first multiplication signal;

a sixth summing element (23) for addition of the first multiplication signal and the estimator output signal for forming a second multiplicand signal;

a second multiplier (25) for multiplying the set-point flow signal by the second multiplicand signal for forming a second multiplication signal; and a fourth summing element (20) for adding the second multiplication signal and a constant coefficient signal ($K_0$) for forming the set-point pressure signal ($P_R$).

16. Device according to claim 10, characterized in that the pressure regulation device (9) includes an eight summing element (21) with an adding input and a subtracting input for subtracting the true pressure signal ($P_A$) from the set-point pressure signal ($P_R$); and a PID-regulator (22), whose input signal is the output signal from the eighth summing element, and whose output signal is the control pressure signal ($P_C$).

17. Device as defined in claim 10, characterized in that the actuator (5) is a pressure regulator.

* * * * *

UNITED STATES PATENT AND TRADEMARK OFFICE
CERTIFICATE OF CORRECTION

PATENT NO. : 5,182,704
DATED : January 26, 1993
INVENTOR(S) : Bengtsson

It is certified that error appears in the above-identified patent and that said Letters Patent is hereby corrected as shown below:

Column 3, line 15, "paint In" should read --paint. In--.

Column 4, line 52, "FIG. 4" should begin a new paragraph.

Column 5, line 5, "pump I" should read --pump 1--;

line 13, "T-AGB-979-797-FF The" should read --T-AGB-979-797-FF. The--

Column 6, line 54, "pressure Under" should read --pressure. Under--;

line 57, "reached Below" should read --reached. Below--.

Column 7, line 54, "input The" should read --input. The--;

line 60, "when" should read --When--;

line 64, "value The" should read --value. The--.

Column 9, line 25, "element 20 therefore" should read --element 20 is therefore--.

UNITED STATES PATENT AND TRADEMARK OFFICE
CERTIFICATE OF CORRECTION

PATENT NO. : 5,182,704
DATED : January 26, 1993
INVENTOR(S) : Bengtsson

It is certified that error appears in the above-identified patent and that said Letters Patent is hereby corrected as shown below:

Column 10, line 6, "signal The" should read --signal. The--;

line 29, "natural The" should read --natural. The--;

line 32, "PID-regulator" should read --PID-regulator.--; and line 40, "voltages The" should read --voltages. The--.

Column 11, line 34, "summing element 23" should read --summing element 23.--;

UNITED STATES PATENT AND TRADEMARK OFFICE
CERTIFICATE OF CORRECTION

PATENT NO. : 5,182,704

DATED : January 26, 1993

INVENTOR(S) : Bengtsson

It is certified that error appears in the above-identified patent and that said Letters Patent is hereby corrected as shown below:

line 50,    "inputs The"    should read --inputs. The--;

line 56,    "above The"    should read --above. The--; and        line 58, "first" should read --first.--

Signed and Sealed this

Sixteenth Day of November, 1993

Attest:

BRUCE LEHMAN

*Attesting Officer*     *Commissioner of Patents and Trademarks*